US011508356B2

United States Patent
Chae (10) Patent No.: US 11,508,356 B2
(45) Date of Patent: Nov. 22, 2022

(54) METHOD AND APPARATUS FOR RECOGNIZING A VOICE

(71) Applicant: LG ELECTRONICS INC., Seoul (KR)

(72) Inventor: Jong Hoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 196 days.

(21) Appl. No.: 16/566,655

(22) Filed: Sep. 10, 2019

(65) Prior Publication Data
US 2020/0005768 A1    Jan. 2, 2020

(30) Foreign Application Priority Data

May 21, 2019    (KR) .......................... 10-2019-0059391

(51) Int. Cl.
*G10L 15/08*    (2006.01)
*H04W 52/02*    (2009.01)
*G06F 3/16*    (2006.01)

(52) U.S. Cl.
CPC .............. *G10L 15/08* (2013.01); *G06F 3/167* (2013.01); *H04W 52/0229* (2013.01); *G10L 2015/088* (2013.01)

(58) Field of Classification Search
None
See application file for complete search history.

(56) References Cited

U.S. PATENT DOCUMENTS

| 5,797,123 | A  * | 8/1998  | Chou    | G10L 15/18 |
| | | | | 704/240 |
| 9,519,455 | B2 * | 12/2016 | Choi    | H04N 21/42204 |
| 10,192,546 | B1 * | 1/2019  | Piersol | G10L 15/08 |
| 2015/0051913 | A1 * | 2/2015 | Choi    | H04M 1/67 |
| | | | | 704/273 |
| 2017/0169826 | A1 * | 6/2017 | Orthagen | G11B 20/10527 |

(Continued)

FOREIGN PATENT DOCUMENTS

| KR | 1020090123396 | 12/2009 |
| KR | 1020160064258 | 6/2016 |

(Continued)

OTHER PUBLICATIONS

Korean Intellectual Property Office Application No. 10-2019-0059391, Office Action dated Jun. 26, 2020, 5 pages.

*Primary Examiner* — Brian L Albertalli
(74) *Attorney, Agent, or Firm* — Lee, Hong, Degerman, Kang & Waimey PC (57) ABSTRACT

Disclosed are a speech recognition method and a speech recognition device, in which speech recognition is performed by executing an artificial intelligence (AI) algorithm and/or a machine learning algorithm provided therein. According to an embodiment of the present disclosure, the speech recognition method includes buffering an inputted spoken utterance, determining whether a preset wake-up word is present in the spoken utterance by comparing the buffered spoken utterance to the preset wake-up word, and in response to the preset wake-up word in the spoken utterance, activating a speech recognition function and isolating, from the spoken utterance, a spoken sentence as a voice command without the wake-up word, and processing the spoken sentence and outputting a processing result.

3 Claims, 7 Drawing Sheets

(56) References Cited

U.S. PATENT DOCUMENTS

| | | | | |
|---|---|---|---|---|
| 2018/0098277 A1* | 4/2018 | Brageul | ................ | H04B 1/385 |
| 2018/0293974 A1* | 10/2018 | Georges | ................ | G10L 15/183 |
| 2019/0043503 A1* | 2/2019 | Bauer | ................ | G10L 15/02 |
| 2019/0279630 A1* | 9/2019 | Keren | ................ | G10L 15/08 |
| 2019/0371310 A1* | 12/2019 | Fox | ................ | G10L 15/08 |
| 2021/0065693 A1* | 3/2021 | Sharifi | ................ | H04M 3/527 |
| 2021/0233556 A1* | 7/2021 | Kashima | ................ | G10L 15/08 |

FOREIGN PATENT DOCUMENTS

| | | |
|---|---|---|
| KR | 1020180069660 | 6/2018 |
| KR | 1020180130889 | 12/2018 |

* cited by examiner

FIG. 8

METHOD AND APPARATUS FOR RECOGNIZING A VOICE

CROSS-REFERENCE TO RELATED APPLICATIONS

Pursuant to 35 U.S.C. § 119(a), this application claims the benefit of earlier filing date and right of priority to Korean Patent Application No. 10-2019-0059391, filed on May 21, 2019, the contents of which are hereby incorporated by reference herein in its entirety.

BACKGROUND

1. Field of the Invention

The present disclosure relates to a speech recognition method and a speech recognition device, and more specifically, to a speech recognition method and a speech recognition device in which a spoken utterance is buffered, a wake-up word and a spoken sentence are isolated from the buffered spoken utterance, and if the wake-up word is present in the spoken utterance, the spoken sentence is isolated and processed regardless of the position of the spoken sentence in the spoken utterance.

2. Description of Related Art

As technology continues to advance, various services using a speech recognition technology are introduced in a number of fields in recent years. A speech recognition technology can be understood as a series of processes including understanding utterances spoken by a speaker and converting the spoken utterances to text data which is recognizable and usable by computers. Furthermore, the speech recognition services using the speech recognition technology may include a series of processes for recognizing a user's spoken utterance and providing a service appropriate thereto.

A speech recognition device using the speech recognition technology described above starts to recognize speech only when a designated command is inputted. The command initiating the speech recognition may be referred to as a wake-up word, and the features associated with the wake-up word recognition, since they typically pose a relatively low computational load, may be always running in the background in a speech recognition device. More specifically, a wake-up word is a word preregistered in the speech recognition device, the word which, when present in the user's spoken utterance, can be recognized by the speech recognition device to enable the speech recognition device to perform a designated task according to a subsequently inputted voice command.

In particular, Related Art 1 and Related Art 2 disclose a technology that enables an electronic device to recognize user's audio signals, and to perform a speech recognition operation when the recognized user's audio signals correspond to a preset keyword (wake-up word).

However, since the speech recognition function is initiated only after the wake-up word is recognized, when the wake-up word is positioned after the spoken sentence, Related Art 1 and Related Art 2 may fail to recognize a spoken sentence that precedes the wake-up word.

The background art described above may be technical information retained by the present inventors in order to derive the present disclosure or acquired by the present inventors along the process of deriving the present disclosure, and thus is not necessarily a known art disclosed to the general public before the filing of the present application.

RELATED ART DOCUMENT

Patent Document

Related Art 1: Korean Patent Laid-Open Publications No. 10-2016-0064258 (published on Jun. 8, 2016)
Related Art 2: Korean Patent Laid-Open Publications No. 10-2009-0123396 (published on Dec. 2, 2009)

SUMMARY OF THE INVENTION

One aspect of the present disclosure aims to address the shortcoming associated with the related art that is unable to recognize the spoken sentence in a user's spoken utterance when the wake-up word is positioned after the spoken sentence.

Another aspect of the present disclosure aims to address the shortcoming associated with the related art that is unable to recognize the spoken sentence in a user's spoken utterance when the wake-up word is positioned within the spoken sentence.

Another aspect of the present disclosure aims to address the shortcoming associated with the related art that is unable to recognize a spoken sentence positioned before the wake-up word in a user's spoken utterance containing two or more spoken sentences.

Another aspect of the present disclosure aims to address, by using optimal process resources, the shortcoming associated with the related art that is unable to recognize a voice command when the wake-up word is positioned after the spoken sentence intended as the voice command.

Advantages and features of the present disclosure and methods for achieving them will become apparent from the descriptions of aspects herein below with reference to the accompanying drawings. However, the present disclosure is not limited to the aspects disclosed herein but may be implemented in various different forms. The aspects are provided to make the description of the present disclosure thorough and to fully convey the scope of the present disclosure to those skilled in the art. It is to be noted that the scope of the present disclosure is defined only by the claims.

DETAILED DESCRIPTION OF THE INVENTION

According to an embodiment of the present disclosure, a speech recognition method, even with a spoken utterance that is unconfirmed for the presence of a wake-up word, temporarily stores a section of the spoken utterance, and if the wake-up word is present therein, analyzes the stored section of the spoken utterance to enable execution of a voice command uttered before the wake-up word.

Furthermore, a speech recognition method according to an embodiment of the present disclosure includes: buffering an inputted spoken utterance; comparing the buffered spoken utterance to a preset wake-up word to determine whether the preset wake-up word is present in the spoken utterance; in response to the preset wake-up word in the spoken utterance, activating a speech recognition function, and isolating, from the spoken utterance, a spoken sentence as a voice command, without the wake-up word; and processing the spoken sentence and outputting a processing result.

Conventionally in the related art, only spoken sentences that are positioned after a wake-up word in a spoken utterance were able to be isolated and processed; however, the speech recognition method according to the present embodiment may buffer a spoken utterance, and if the wake-up word is present in the buffered spoken utterance, may activate the speech recognition function, isolate and process a spoken sentence regardless of the position of the spoken sentence in the spoken utterance, thus resulting in improvements in speech recognition processing performance.

In addition, the buffering further includes buffering by varying a buffering volume or time in accordance with an environment condition under which the spoken utterance is inputted.

Through the buffering according to the present embodiment, a spoken utterance for performing accurate speech recognition may be obtained by varying the buffering volume or time for the spoken utterance in accordance with an environment condition under which the spoken utterance is inputted. Examples of the environment condition include, but are not limited to, a time at which the spoken utterance is inputted, a place at which the spoken utterance is inputted, a pitch of the spoken utterance, an accuracy of the spoken utterance, a speed of the spoken utterance.

Furthermore, the isolating may further include isolating, from the spoken utterance, the spoken sentence preceding the wake-up word; isolating, from the spoken utterance, a first spoken segment preceding the wake-up word and a second spoken segment following the wake-up word without the wake-up word, without the wake-up word positioned within the spoken sentence; and isolating, from the spoken utterance containing two or more spoken sentences, the two or more spoken sentences without the wake-up word positioned therebetween.

Through the isolating according to the present embodiment, if the wake-up word is present in the spoken utterance, the speech recognition function for recognizing the contents of a voice command may be activated, and regardless of the position of the spoken sentence, the spoken sentence as a voice command without the wake-up word may be isolated from the spoken utterance and processed, and a processing result may be outputted, thereby resulting in improvements in speech recognition processing performance.

In addition, the outputting may include outputting the processing result of a single voice command formed by combining the first spoken segment preceding the wake-up word and the second spoken segment following the wake-up word; and sequentially outputting a result of sequentially processing the two or more spoken sentences or outputting, at once, a result of batch processing the two or more spoken sentences.

Through the outputting according to the present embodiment, various output results may be provided corresponding to user's spoken utterances, thus increasing reliability of the speech recognition device.

The speech recognition device according to one embodiment of the present disclosure may include a buffer configured to buffer an inputted spoken utterance, a determiner configured to compare the spoken utterance buffered by the buffer to a preset wake-up word, to determine whether the preset wake-up word is present in the spoken utterance, an isolator configured to activate speech recognition function in response to the preset wake-up word present in the spoken utterance and to isolate a spoken sentence as a voice command without the wake-up word from the spoken utterance, and a controller configured to control such that the spoken sentence is processed and a processing result is outputted.

By the speech recognition device according to the present embodiment, a spoken utterance may be buffered, and in response to the wake-up word present in the buffered spoken utterance, the speech recognition function may be activated, and regardless of the position of the spoken sentence, the spoken sentence may be isolated and processed, and a processing result may be outputted, thus improving the speech recognition processing performance.

Furthermore, the speech recognition device according to the present embodiment may further include a variator which is configured to vary the buffering volume or time of the buffer in accordance with an environment condition under which the spoken utterance is inputted.

Through the variator according to the present embodiment, a spoken utterance for performing accurate speech recognition may be obtained by varying the buffering volume or time for the spoken utterance in accordance with an environment condition under which the spoken utterance is inputted. Examples of the environment condition include, but are not limited to, a time at which the spoken utterance is inputted, a place at which the spoken utterance is inputted, a pitch of the spoken utterance, an accuracy of the spoken utterance, and a speed of the spoken utterance.

In addition, the isolator may isolate, from the spoken utterance, the spoken sentence preceding the wake-up word; isolate, from the spoken utterance, a first spoken segment preceding the wake-up word and a second spoken segment following the wake-up word, without the wake-up word, wherein the wake-up word is positioned within the spoken sentence; and isolate, from the spoken utterance containing two or more spoken sentences, the two or more spoken sentences without the wake-up word, wherein the wake-up word is positioned between the two or more spoken sentences.

Through the isolator according to the present embodiment, if the wake-up word is present in the spoken utterance, the speech recognition function for recognizing the contents of a voice command may be activated, and regardless of the position of the spoken sentence, the spoken sentence as a voice command without the wake-up word may be isolated and processed from the spoken utterance, and a processing result may be outputted, thereby improving the speech recognition processing performance.

In addition, the controller may control such that a processing result of a single voice command formed by combining together a first spoken segment preceding the wake-up word and a second spoken segment following the wake-up word can be outputted; control such that a result of sequentially processing two or more spoken sentences can be sequentially outputted; or control such that a result of batch processing two or more spoken sentences can be outputted at once.

Through the controller according to the present embodiment, various output results may be provided corresponding to user's spoken utterances, thereby increasing reliability of the speech recognition device.

According to the present disclosure, a spoken utterance may be buffered, and in response to a wake-up word present in the buffered spoken utterance, a speech recognition function may be activated, and a spoken sentence, regardless of its position within the spoken utterance, may be isolated and processed, and a processing result may be outputted, improving the speech recognition processing performance.

In addition, by varying a buffering time for the spoken utterance in accordance with an environment condition under which the spoken utterance is inputted, the spoken utterance for carrying out accurate speech recognition may be obtained.

In addition, various output results may be provided corresponding to user's spoken utterances, thus increasing reliability of the speech recognition device.

In addition, a voice command intended by a user may be recognized and processed only by using optimal processor resources, thus improving the power efficiency of the speech recognition device.

Advantages of the present disclosure are not limited to those described in the embodiments of the present disclosure, and other advantages from the following description. Furthermore, other advantages will be more clearly understood by those having ordinary skill in the art from the following description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION OF THE INVENTION

Advantages and features of the present disclosure and methods of achieving the advantages and features will be more apparent with reference to the following detailed description of embodiments in connection with the accompanying drawings. However, the description of particular embodiments is not intended to limit the present disclosure to the particular embodiments disclosed herein, but on the contrary, it should be understood that the present disclosure is to cover all modifications, equivalents and alternatives falling within the spirit and scope of the present disclosure. The embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular embodiments, and is not intended to limit the scope of the present disclosure. It must be noted that as used herein and in the appended claims, the singular forms "a," "an," and "the" include the plural references unless the context clearly dictates otherwise. It should be understood that the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components. Furthermore, the terms such as "first," "second," and other numerical terms may be used herein only to describe various elements, but these elements should not be limited by these terms. Furthermore, these terms such as "first," "second," and other numerical terms may be used herein only to describe various elements, but these elements should not be limited by these terms. Furthermore, these terms such as "first," "second," and other numerical terms, are used only to distinguish one element from another element.

Hereinbelow, the embodiments of the present disclosure will be described in greater detail with reference to the accompanying drawings, and on all these accompanying drawings, the identical or analogous elements are designated by the same reference numeral, and repeated descriptions of the common elements will be omitted.

Figure 1:
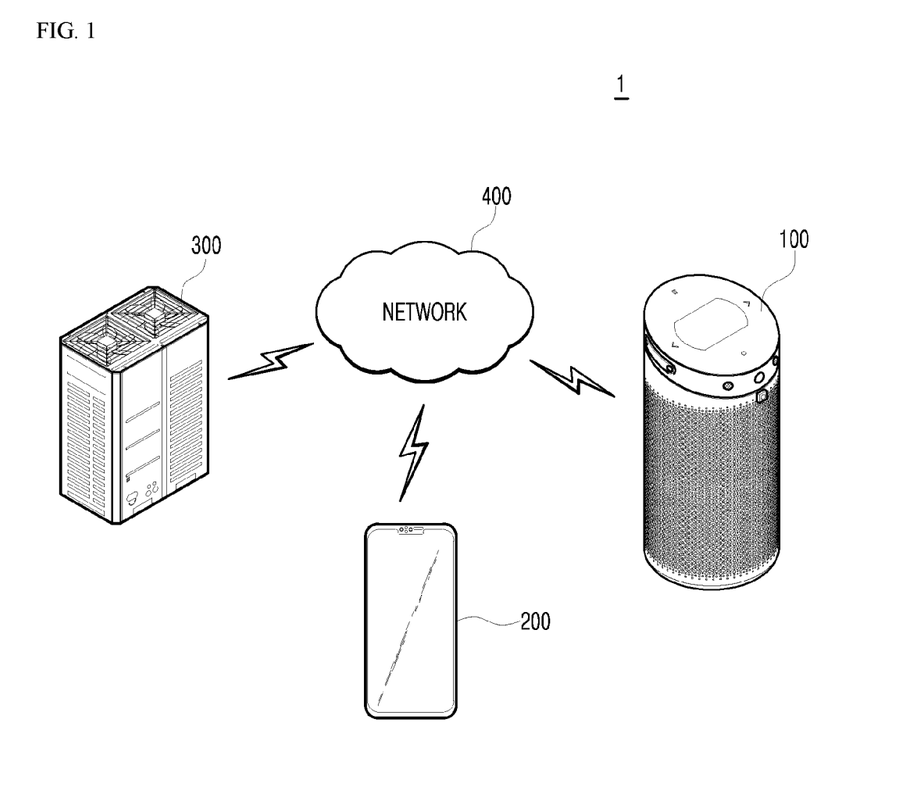
FIG. 1 is a diagram illustrating a speech recognition condition according to an embodiment of the present disclosure, including a speech recognition device, a user terminal, a server, and a network connecting the speech recognition device, the user terminal, and the server to one another.

FIG. 1 is a diagram illustrating a speech recognition condition according to an embodiment of the present disclosure, including a speech recognition device, a user terminal, a server, and a network connecting the speech recognition device, the user terminal, and the server to one another.

FIG. 1 illustrates a state in which a speech recognition device 100, a user terminal 200, and a server 300 are communicatively connected to one another via a network 400. The speech recognition device 100 includes a communicator (110 in FIG. 3) that enables to transmit and receive data to and from the server 300 and the user terminal 200 corresponding to a personal communication device via the network 400 which may be wire-based or wireless.

The speech recognition device 100 may receive a spoken utterance from a user and provide a speech recognition service through recognition and analysis of the spoken utterance. The speech recognition device 100 may include an artificial intelligence (AI) speaker and act as a hub controlling an electronic device that does not have voice input/output functionality.

Here, the spoken utterance may contain a wake-up word and a spoken sentence. The wake-up word is a designated command that activates the speech recognition function of the speech recognition device 100 and is herein referred to as "wake-up word". The speech recognition function is activated only when the wake-up word is present in the spoken utterance, and therefore, when the spoken utterance does not contain the wake-up word, the speech recognition function remains in an inactive state (for example, in a sleep mode). Such a wake-up word may be preset and stored in a memory (160 in FIG. 3) that will be described later.

The spoken sentence is a part of the spoken utterance that does not include the wake-up word, and may contain a voice command that the speech recognition device 100 can actually process and generate output from. For example, given "Eeoseutaya eeokeoneul kyeojwo (Airstar, turn on the air conditioner)" as the spoken utterance, the wake-up word in this case would be "Eeoseutaya (Airstar)" and the spoken sentence would be "eeokeoneul kyeojwo (turn on the air conditioner)". In this case, the speech recognition device 100 may receive and analyze the spoken utterance, determine whether the wake-up word is present therein, and execute the spoken sentence, thereby controlling an air conditioner (not illustrated) as an electronic device.

In the present embodiment, the spoken sentence may be a unit for containing a single voice command. In a case when the spoken sentence contains a single voice command, the wake-up word may be positioned before the spoken sentence, may be positioned after the spoken sentence, or may be positioned within the spoken sentence. When the wake-up word is positioned within the spoken sentence, the spoken sentence may include two or more spoken segments. For example, in a case when the spoken utterance is "Eeokeoneul eeoseutaya kyeojwo (Turn on, Airstar, the air conditioner)", the wake-up word "eeoseuta (Airstar)" would be positioned within the spoken sentence "Eeokeoneul kyeojwo (Turn on the air conditioner)". In this case, the spoken sentence may include a first spoken segment "Eeokeoneul (the air conditioner)" preceding the wake-up word, and a second spoken segment "kyeojwo (turn on)" following the wake-up word. Without the wake-up word positioned within the spoken sentence, the first spoken segment preceding the wake-up word and the second spoken segment following the wake-up word may be combined together to form the spoken sentence which serves as a single voice command.

In some embodiments, the spoken sentence may include two or more voice commands. In a case when the spoken sentence includes two or more voice commands, the wake-up word may be positioned between a first spoken sentence and a second spoken sentence; may be positioned before the first spoken sentence; may be positioned after the first spoken sentence (thereby preceding the second spoken sentence); or may be positioned within the first spoken sentence; may be positioned after the second spoken sentence; or may be positioned within the second spoken sentence. For example, given "Eeokeoneul kyeojwo eeoseutaya geurigo cheongjeong modeuro unjeonhaejwo (Turn on the air conditioner, Airstar, and drive it in clean mode)" as the spoken utterance, the wake-up word "eeoseuta (Airstar)" is positioned between the first spoken sentence "Eeokeoneul kyeojwo (turn on the air conditioner)" and the second spoken sentence "geurigo cheongjeong modeuro unjeonhaejwo (and drive it in clean mode)". Without the wake-up word positioned between the two spoken sentences, the first spoken sentence preceding the wake-up word and the second spoken sentence following the wake-up word may be individually processed, and a processing result may be outputted; or the first spoken sentence preceding the wake-up word and the second spoken sentence following the wake-up word may be batch processed, and a processing result may be outputted.

In the present embodiment, the speech recognition device 100 may buffer an inputted spoken utterance and compare the buffered spoken utterance to a preset wake-up word to determine whether the preset wake-up word is present in the spoken utterance. The speech recognition device 100 may activate the speech recognition function in response to the preset wake-up word included in the spoken utterance, isolate the spoken sentence as a voice command without the wake-up word from the spoken utterance, process the spoken sentence, and output a processing result.

The speech recognition device 100 may isolate the spoken sentence from the spoken utterance, the spoken sentence preceding the wake-up word; isolate from the spoken utterance, a first spoken segment preceding the wake-up word and a second spoken segment following the wake-up word, without the wake-up word the wake-up word being positioned within the spoken sentence; and isolate from the spoken utterance containing two or more spoken sentences, the two or more spoken sentences without the wake-up word, the wake-up word being positioned between the two or more spoken sentences. Here, the speech recognition device 100 may combine the first spoken segment preceding the wake-up word and the second spoken segment following the wake-up word, and may output a result of processing a single voice command formed thereby The user terminal 200 may control driving of the speech recognition device 100 through the server 300. Furthermore, the user terminal 200 may receive, from the speech recognition device 100, various messages regarding an operation of the speech recognition device 100. Types of such messages may include, but are not limited to, notification messages indicating the start and/or end of speech recognition processing of the speech recognition device 100, alarm messages indicating occurrences of abnormal situations within the speech recognition device 100, and so forth. These notification messages and/or alarm messages may be simultaneously transmitted and outputted through a user interface (not illustrated) of the speech recognition device 100 and the user terminal 200.

The user terminal 200 includes a communication terminal capable of performing functions of a computing device (not illustrated) and may include, but is not limited to, a user-operable desktop computer, a smartphone, a notebook computer, a tablet PC, a smart TV, a mobile phone, a personal digital assistant (PDA), a laptop computer, a media player, a micro server, a global positioning system (GPS) device, an E-book reader, a digital broadcasting terminal, a navigation system, a kiosk information system, an MP3 player, a digital camera, a home appliance, and other mobile or immobile computing devices. In addition, the user terminal 200 may be a wearable terminal implemented with a communication function and a data processing function, such as a wearable watch, wearable glasses or goggles, a wearable hairband, a wearable ring, and the like. The user terminal 200 is not limited to the aforementioned items and may be any terminal capable of web-browsing.

The server 300 may be a database server which provides big data required for applications of various artificial intelligence algorithms, data on speech recognition, and the like. Furthermore, the server 300 may include a web server or application server that enables remote control of the speech recognition device 100 by using an application or web browser provided on the user terminal 200.

Artificial intelligence is an area of computer engineering science and information technology that studies methods to make computers mimic intelligent human behaviors such as reasoning, learning, self-improving, and the like.

In addition, artificial intelligence (AI) does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. More specifically, machine learning is a technology that investigates and builds systems, and algorithms for such systems, which are capable of learning, making predictions, and enhancing their own performance on the basis of experiential data. Machine learning algorithms, rather than only executing rigidly- set static program commands, may be used to take an approach that builds models for deriving predictions and decisions from inputted data.

The server 300 may buffer a spoken utterance received from the speech recognition device 100 and compare the buffered spoken utterance to a preset wake-up word to determine whether the preset wake-up word is present in the spoken utterance, and in a case when the preset wake-up word is present in the spoken utterance, the server 300 may simultaneously activate the speech recognition function and isolate a spoken sentence from the spoken utterance without the wake-up word, and then transmit a result of processing the spoken sentence to the speech recognition device 100. As described above, speech recognition processing processes may be performed by the server 300.

The network 400 may serve to connect the speech recognition device 100 and the user terminal 200 to each other. The network 400 includes, but is not limited to, wire-based networks such as LANs (local area networks), wide area networks (WANs), metropolitan area networks (MANs), and integrated service digital networks (ISDNs); or wireless networks such as wireless LANs, CDMA, Bluetooth communications, satellite communications, and so forth. In addition, the network 400 may transmit or receive data using short-range communication and/or long-range communication technologies. Examples of the short-range communication technologies may include Bluetooth, radio frequency identification (RFID), infrared data association (IrDA), ultra-wideband (UWB), ZigBee, and wireless fidelity (Wi-Fi). Examples of the long-range communication technologies may include code division multiple access (CDMA), frequency division multiple access (FDMA), time division multiple access (TDMA), orthogonal frequency division multiple access (OFDMA), and single carrier frequency division multiple access (SC-FDMA).

The network 400 may include connections of network elements, such as hubs, bridges, routers, switches, gateways, and so forth. The network 400 may include a public network such as the Internet, and a private network such as an organization's secured private network, and may also include one or more connected networks as in a multi-network condition. Access to the network 400 may be provided through one or more wire-based or wireless access networks.

Figure 2:
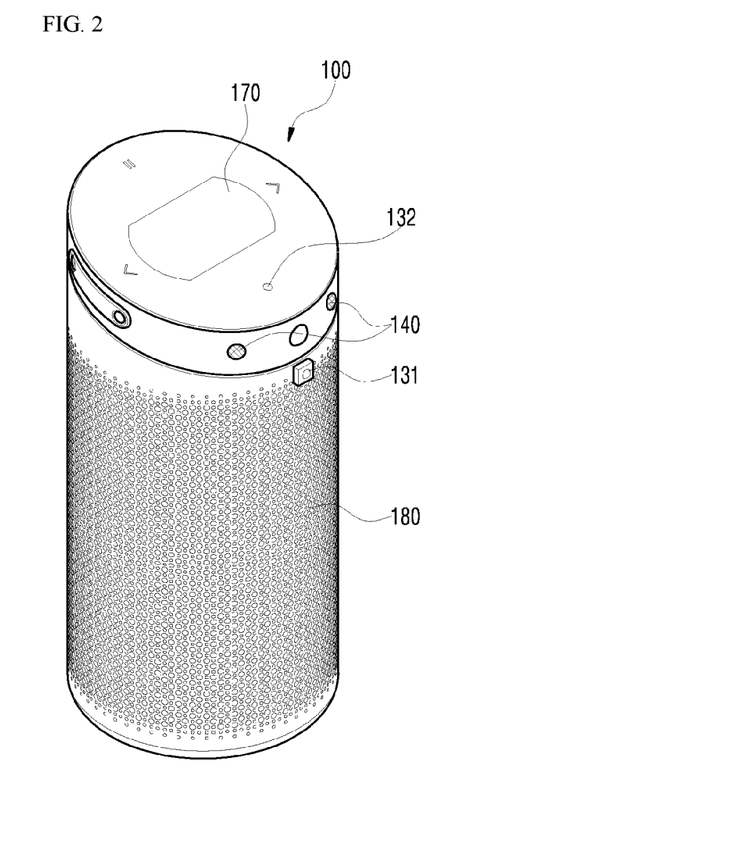
FIG. 2 is an illustrative diagram showing an outer appearance of a speech recognition device according to an embodiment of the present disclosure.
Figure 3:
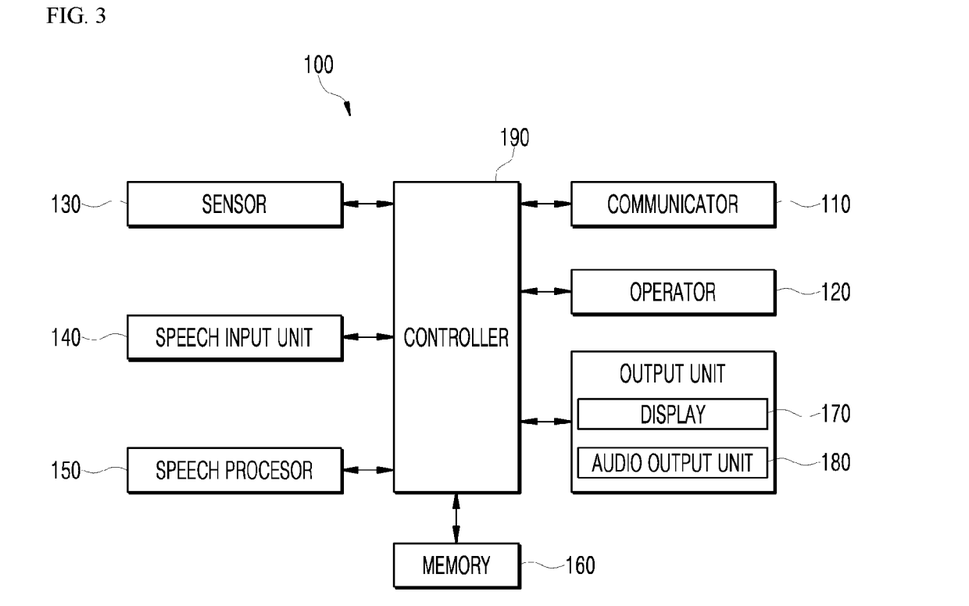
FIG. 3 is a schematic block diagram of a speech recognition device according to an embodiment of the present disclosure.

FIG. 2 is a diagram illustrating an external appearance of a speech recognition device according to an embodiment of the present disclosure, and FIG. 3 is a block diagram schematically illustrating a speech recognition device according to an embodiment of the present disclosure. Hereinbelow, a repetitive description of the common parts previously described with reference to FIG. 1 will be omitted. Referring to FIG. 2 and FIG. 3, the speech recognition device 100 may include a communicator 110, an operator 120, a sensor 130 including a proximity sensor 131 and an image sensor 132, a speech input unit 140, a speech processor 150, a memory 160, a display 170, an audio output unit 180, and a controller 190.

The communicator 110 may provide in connection with the network 400 a communication interface required to provide, as packet data, transmission/reception signals between the speech recognition device 100 and another electronic device and/or a user terminal 200. Furthermore, the communicator 110 may receive a predetermined information request signal from the electronic device and/or the user terminal 200, and may transmit information processed by the speech recognition device 100 to the electronic device and/or the user terminal 200. The communicator 110 may be a device that includes hardware and software required for transmission/reception of signals such as control signals, data signals, and so forth, with another network device through wire-based or wireless connections.

The operator 120 may have a plurality of operable buttons (not illustrated) and may transmit a signal corresponding to an operated button to the controller 190. In the present embodiment, the operator 120 may include first to fourth contact switches (not illustrated) and an exact process of processing an output signal of each contact switch may be determined by a program pre-stored in the memory 160. For example, by operation signals of the first contact switch or the second contact switch, menu items horizontally displayed on the display 170 may be selected; and by operation signals of the third contact switch or the fourth contact switch, menu items vertically displayed on the display 170 may be selected. In addition, the speech recognition function may be activated by operating one of the first to fourth contact switches.

The sensor 130 may include the image sensor 132 and the proximity sensor 131 configured to sense an environment condition around the speech recognition device 100. The proximity sensor 131 may acquire data on the location of an object (for example, a user) located around the speech recognition device 100 by using far-infrared rays or the like. Furthermore, data on user's location acquired by the proximity sensor 131 may be stored in the memory 160.

The image sensor 132 may include a camera (not illustrated) capable of capturing an image of the surrounding of the speech recognition device 100, and for image-capturing efficiency, a plurality of cameras may be provided therein. For example, each camera may include an image sensor (for example, a CMOS image sensor) which includes at least one optical lens and a plurality of photodiodes (for example, pixels) forming an image using the light passed through the optical lens, and may include a digital signal processor (DSP) for forming an image based on signals outputted from the photodiodes. The digital signal processor may generate not only a static image, but also a dynamic image formed of frames of static images. Meanwhile, the image captured and acquired by the camera serving as the image sensor 132 may be stored in the memory 160.

The sensor 130, although limited to the proximity sensor 131 and the image sensor 132 in the present embodiment, may also include various other sensors, such as a temperature sensor, a humidity sensor, a vibration sensor, etc., each capable of sensing an environment condition around the speech recognition device 100. Furthermore, information detected by the sensor 130 may be stored in the memory 160.

The speech input unit 140 may have a spoken utterance inputted thereto, the spoken utterance uttered towards the speech recognition device 100 by a user. To this end, the speech input unit 140 may be provided with one or more microphones (not illustrated). In addition, to allow the spoken utterance to be received more accurately, the speech input unit 140 may be provided with a plurality of microphones (not illustrated). Here, the plurality of microphones may be disposed in different locations by being spaced apart from each other, and may process the received spoken utterance into electrical signals.

In some embodiments, the speech input unit 140 may use various noise removing algorithms for removing the noise generated during the process of receiving the spoken utterance. In some embodiments, the speech input unit 140 may include various components for processing audio signals. For example, the speech input unit 140 may include a filter (not illustrated) for removing noise when receiving a spoken utterance, an amplifier (not illustrated) for amplifying signals outputted from the filter and outputting the amplified signals, and the like.

The speech processor 150 may buffer a spoken utterance inputted through the speech input unit 140, and compares the buffered spoken utterance to a preset wake-up word to determine whether the preset wake-up word is present in the spoken utterance. If the preset wake-up word is present in the spoken utterance, the speech processor 150 may activate the speech recognition function and also isolate, from the spoken utterance, a spoken sentence without the wake-up word.

The speech recognition device 100 may isolate the spoken sentence from the spoken utterance, the spoken sentence preceding the wake-up word; isolate from the spoken utterance, a first spoken segment preceding the wake-up word and a second spoken segment following the wake-up word without the wake-up word without the wake-up word, the wake-up word being positioned within the spoken sentence; and isolate from the spoken utterance containing two or more spoken sentences, the two or more spoken sentences without the wake-up word, the wake-up word being positioned between the two or more spoken sentences. Here, the controller 190 may control such that a processing result of a single voice command, which is formed by combining the first spoken segment preceding the wake-up word and the second spoken segment following the wake-up word, can be outputted. Hereinbelow, the speech processor 150 will be described in greater detail with reference to FIG. 4 and FIG. 5.

The memory 160 may include a volatile or non-volatile recording medium and may have recorded therein various data required for the operation of the speech recognition device 100. The recording medium is configured to store data readable by the controller 190, and may include a hard disk drive (HDD), a solid state disk (SSD), a silicon disk drive (SDD), ROM, RAM, CD-ROM, a magnetic tape, a floppy disk, a light data storage device, and the like.

Meanwhile, the data for speech recognition may be stored in the memory 160, and the controller 190 may process user's spoken utterance signals received through the speech input unit 140 and may perform speech recognition processes.

Here, a relatively simple speech recognition task may be executed by the speech recognition device 100, while a relatively more advanced speech recognition task, such as natural language processing, may be executed on the server 300. For example, upon receipt of a signal of a spoken utterance containing the preset wake-up word, the speech recognition device 100 may switch to a state that is capable of receiving a spoken sentence as a voice command. Then, the speech recognition device 100 may execute, of the speech recognition process, up to a stage at which it is determined whether or not the wake-up word is inputted, and the remainder of the speech recognition process, involving the contents of a voice command of the inputted spoken utterance may be executed through the server 300. Since the system resource of the speech recognition device 100 is limited, complicated natural language recognition and processing may be executed on the server 300.

The memory 160 may store therein limited data. For example, a preset wake-up word for determining the presence of the wake-up word in the spoken utterance may be stored in the memory 160. The wake-up word may be set by the manufacturer. For instance, "Eeoseuta (Airstar)" may be set as the wake-up word and may be later modified by a user.

The processing result of a spoken sentence processed by the controller 190 may be outputted through an output unit, and the output unit may include a display 170 and an audio output unit 180. The display 170 may display, as image, processing results, operation mode, operation status, error status, etc. corresponding to the spoken sentence within the spoken utterance. In some embodiments, the display 170 may include a touchscreen which forms an interlayer structure with a touchpad. In this case, the display 170 may be utilized, not only as an output device, but also as an input device to which data can be inputted by a user's touch.

The display 170 may display a driving mode, a current state, and setting items of the speech recognition device 100, through various visual images, letters, numerals, and symbols, as well as through graphic images such as icons. In addition, the display 170 may display information corresponding to each stage of the process of processing the inputted spoken utterance.

The audio output unit 180 may output an audio signal. For example, under control of the controller 190, the audio output unit 180 may output, as audio, an alarm sound, notification messages regarding an operation mode, an operation status, an error status, etc., information corresponding to user's spoken sentence, processing results corresponding to user's spoken sentence, and the like. The audio output unit 180 may convert electric signals received from the controller 190 into audio signals and may output the converted audio signals. To this end, the audio output unit 180 may be provided with a speaker (not illustrated) or the like.

The controller 190 may control the display 170 to provide visual information corresponding to each stage of the speech recognition process and the process of controlling the electronic device, and may control the audio output unit 180 to provide audio information corresponding to each stage of the speech recognition process and the process of controlling the electronic device. In the present embodiment, the controller 190 may control such that the processing result of a spoken sentence isolated by the speech processor 150 through the display 170 and/or the audio output unit 180 can be outputted.

The controller 190 may be a central processing unit of a kind that is capable of providing various functions, such as driving control software installed in the memory 160, and controlling the display 170 and/or the audio output unit 180 to output a processing result of a spoken sentence. Here, the controller 190 may include a device of any kind capable of processing data, such as a processor. Here, the term 'processor' may refer to a data processing device built in hardware, which includes physically structured circuits to execute functions represented as a code or command included in a program. Examples of the data processing device built in a hardware include, but are not limited to, processing devices such as a microprocessor, a central processing unit (CPU), a processor core, a multiprocessor, an application-specific integrated circuit (ASIC), a field programmable gate array (FPGA).

In the present embodiment, the speech recognition device 100 may perform machine learning, such as deep learning, on user's spoken utterance signals received, and the memory 160 may store data to be used in machine learning, result data, and so on.

Deep learning, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN), and may be configured as a deep neural network (DNN) such as a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is heavily used in natural language processing and the like, and may configure an artificial neural network structure by building up layers at each instance with a structure effective for processing time-series data which vary over a course of time. A DBN may include a deep learning structure formed by stacking up multiple layers of a deep learning scheme, restricted Boltzmann machines (RBM). A DBN has the number of layers formed by repeating RBM training. A CNN may include a model mimicking a human brain function, built under the assumption that when a person recognizes an object, the brain extracts the most basic features of the object and recognizes the object as a result of complex processing in the brain.

Meanwhile, the artificial neural network can be trained by adjusting connection weights between nodes (if necessary, adjusting bias values as well) so as to produce desired output from given input. Also, the artificial neural network can continuously update the weight values through learning. Furthermore, methods such as back propagation may be used in training the artificial neural network.

Meanwhile, the speech recognition device 100 may be provided with an artificial neural network and perform machine learning-based user recognition and user's voice color recognition using received audio input signals as input data.

The controller 190 may include an artificial neural network, for example, a deep neural network (DNN) and train the DNN. Examples of the DNN may include CNN, RNN, DBN, and so forth. As a machine learning method for such an artificial neural network, both unsupervised learning and supervised learning may be used. The controller 190 may control such that an artificial neural network structure related to voice tone recognition is updated after learning.

Figure 4:
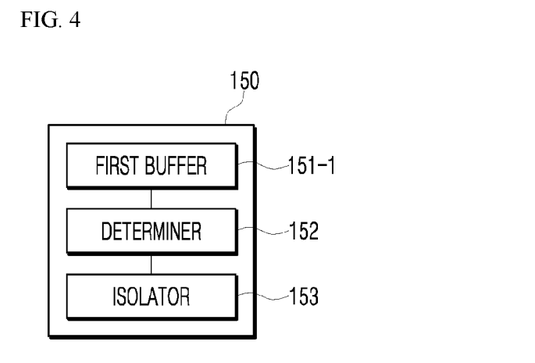
FIG. 4 is a schematic block diagram of a speech processor of the speech recognition device shown in FIG. 3, according to an embodiment.

FIG. 4 is a schematic block diagram of a speech processor of the speech recognition device shown in FIG. 3 according to an embodiment. Hereinbelow, a repetitive description of the parts previously described with reference to FIG. 1 to FIG. 3 will be omitted. Referring to FIG. 4, the speech processor 150 according to an embodiment may include a first buffer 151-1, a determiner 152, and an isolator 153.

The first buffer 151-1 may buffer a user's spoken utterance inputted through the speech input unit 140. Here, the first buffer 151-1 may include a static buffer with a fixed buffering capacity for buffering the spoken utterance.

The determiner 152 may compare the spoken utterance buffered by the first buffer 151-1 to a preset wake-up word stored in the memory 160 to determine whether the preset wake-up word is present in the spoken utterance.

If the result of determining by the determiner 152 indicates that the preset wake-up word is present in the spoken utterance, the speech recognition function may be activated, and the isolator 153 may isolate a spoken sentence without the wake-up word from the buffered spoken utterance. More specifically, within the buffered spoken utterance, the wake-up word may be positioned after the spoken sentence or within the spoken sentence; the spoken sentence may be positioned after the wake-up word; or the wake-up word may be positioned between two or more spoken sentences. Furthermore, the buffered spoken utterance may be a spoken sentence including a wake-up word, may be a wake-up word alone, or may be a spoken sentence alone.

If the result of determining by the determiner 152 indicates the absence of the preset wake-up word in the buffered spoken utterance, the speech recognition function may be inactivated (for example, in a standby mode), and the isolator 153 may remain in a standby state.

The isolator 153 may isolate, from the buffered spoken utterance, a spoken sentence to be processed by the controller 190. For example, the isolator 153 may isolate a spoken sentence preceding the wake-up word, from the buffered spoken utterance; isolate a spoken sentence following the wake-up word, from the buffered spoken utterance; isolate first and second spoken segments from the buffered spoken utterance, without the wake-up word positioned within the spoken sentence, the first spoken segment preceding the wake-up word and the second spoken segment following the wake-up word; and from the buffered spoken utterance containing two or more spoken sentences, isolating the two or more spoken sentences without the wake-up word positioned between the two or more spoken sentences.

The controller 190 may control such that the result of processing a single voice command is be outputted, the single voice command formed by combining the first and second spoken segments isolated by the isolator 153, the first spoken segment preceding the wake-up word and the second spoken segment following the wake-up word. Furthermore, the controller 190 may control such that a spoken sentence isolated by the isolator 153 is processed and a processing result of the spoken sentence are outputted through the display 170 and/or the audio output unit 180. Here, the processing result of the spoken sentence may include a result of controlling an electronic device connected to the speech recognition device 100 according to the spoken sentence.

In some embodiments where two or more spoken sentences are present in a given spoken utterance, the controller 190 may control such that a result of sequentially processing the two or more spoken sentences is sequentially outputted through the display 170 and/or the audio output unit 180. Alternatively, the controller 190 may control such that a result of batch processing the two or more spoken sentences is outputted at once through the display 170 and/or the audio output unit 180.

Figure 5:
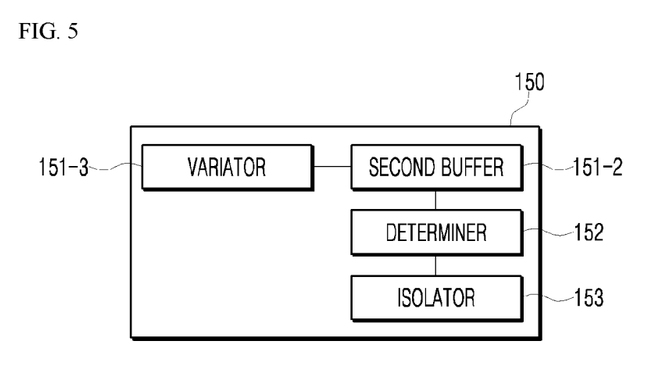
FIG. 5 is a schematic block diagram of a speech processor of the speech recognition device shown in FIG. 3, according to another embodiment.

FIG. 5 is a schematic block diagram of a speech processor of the speech recognition device shown in FIG. 3, according to another embodiment. Hereinbelow, a repetitive description of the parts previously described with reference to FIG. 1 to FIG. 4 will be omitted. Referring to FIG. 5, the speech processor 150 according to another embodiment may include a second buffer 151-2, a variator 151-3, a determiner 152, and an isolator 153.

The second buffer 151-2 may buffer a user's spoken utterance inputted through the speech input unit 140. Here, the second buffer 151-2 may include a dynamic buffer with a varying buffering capacity for buffering the spoken utterance.

The variator 151-3 may vary a buffering volume or buffering time of the second buffer 151-2 in response to an environment condition under which the spoken utterance is inputted through the speech input unit 140.

Here, the environment condition under which the spoken utterance is inputted may include, but is not limited to, a time at which the spoken utterance is inputted, a place at which the spoken utterance is inputted, a pitch of the spoken utterance, an accuracy of the spoken utterance, the gender of the speaker of the spoken utterance, and a speed of the spoken utterance. Each environment condition under which the spoken utterance is inputted is given its own reference value, and by comparing a particular environment condition to a corresponding reference value, the variator 151-3 may hold the buffering volume or buffering time in a current state if that environment condition falls within a margin of error with respect to the corresponding reference value; may decrease the buffering volume or buffering time so as to be less than a current state if the environment condition under which the spoken utterance is inputted exceeds the corresponding reference value; and may increase the buffering volume or buffering time so as to be greater than the current state if that environment condition under which the spoken utterance is inputted is less than the corresponding reference value. Here, since different environment conditions, under which the spoken utterance is inputted, are given different reference values, when a particular environment condition is compared to a corresponding reference value, the buffering volume or buffering time may increase so as to be greater than a current state if the environment condition exceeds the reference value; and the buffering volume or buffering time may decrease so as to be less than the current state if the environment condition is less than the reference value.

The determiner 152, by comparing the spoken utterance buffered by the first buffer 151-1 to a preset wake-up word stored in the memory 160, may determine whether the preset wake-up word is present in the spoken utterance.

If the result of determining by the determiner 152 indicates that the preset wake-up word is present in the spoken utterance, the speech recognition function may be activated, and the isolator 153 may isolate a spoken sentence without the wake-up word from the buffered spoken utterance. Here, within the buffered spoken utterance, the wake-up word may be present after the spoken sentence or within the spoken sentence; the spoken sentence may be present after the wake-up word; or the wake-up word may be present between two or more spoken sentences. Furthermore, the buffered spoken utterance may be a spoken sentence containing a wake-up word, or may be a wake-up word alone, or may be a spoken sentence alone.

If a result of determining by the determiner 152 indicates that the preset wake-up word is absent in the buffered spoken utterance, the speech recognition function may be inactivated (for example, in a standby mode) and the isolator 153 may remain in a standby state.

The isolator 153 may isolate, from the buffered spoken utterance, a spoken sentence to be processed by the controller 190. For example, the isolator 153 may isolate a spoken sentence preceding the wake-up word from the buffered spoken utterance; isolate a spoken sentence following the wake-up word from the buffered spoken utterance; isolate first and second spoken segments from the buffered spoken utterance, without the wake-up word positioned within the spoken sentence, the first spoken segment preceding the wake-up word and the second spoken segment following the wake-up word; and from the buffered spoken utterance containing two or more spoken sentences, isolating the two or more spoken sentences without the wake-up word positioned therebetween.

The controller 190 may control such that a processing result of a single voice command formed by combining first and second spoken segments isolated by the isolator 153 is outputted, the first spoken segment preceding the wake-up word and the second spoken segment following the wake-up word. The controller 190 may control such that a spoken sentence isolated by the isolator 153 is processed, and a processing result of the spoken sentence is outputted through the display 170 and/or the audio output unit 180. Here, the processing result of the spoken sentence may include a result of controlling an electronic device connected to the speech recognition device 100 according to the spoken sentence.

In some embodiments where two or more spoken sentences are present in the spoken utterance, the controller 190 may control such that a result of sequentially processing the two or more spoken sentences is sequentially outputted through the display 170 and/or the audio output unit 180. Alternatively, the controller 190 may control such that a result of batch processing the two or more spoken sentences is outputted at once through the display 170 and/or the audio output unit 180.

Figure 6:
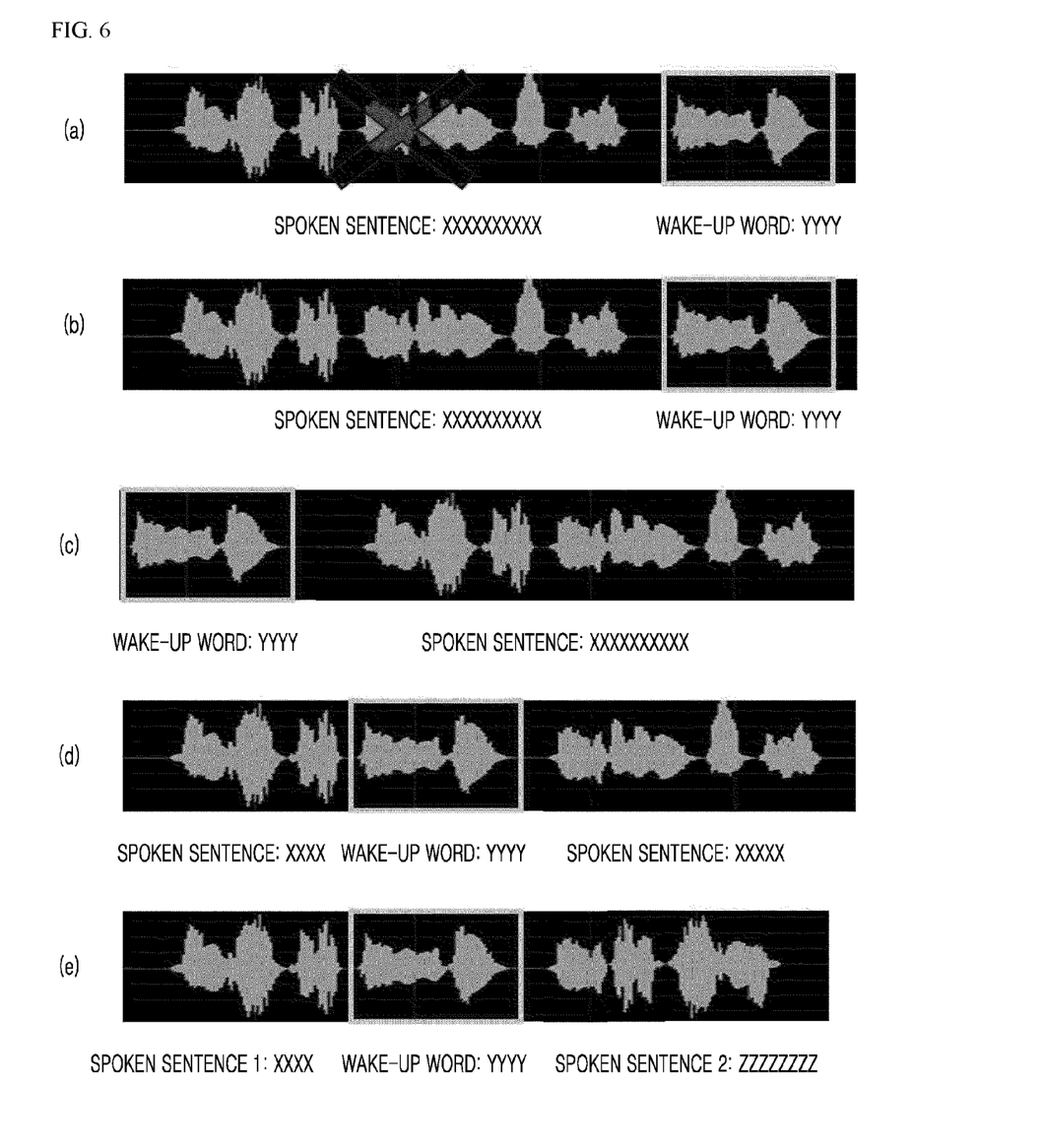
FIG. 6 is waveform diagrams of user's spoken utterances stored in a buffer of the speech recognition device shown in FIG. 3.

FIG. 6 illustrates waveform diagrams of user's spoken utterances buffered by a buffer of the speech recognition device shown in FIG. 3. Hereinbelow, a repetitive description of the parts previously described with reference to FIG. 1 to FIG. 5 will be omitted. Referring to FIG. 6, FIG. 6A illustrates a waveform diagram of a user's spoken utterance according to the related art, and FIG. 6B through FIG. 6E illustrate waveform diagrams of user's spoken utterances buffered by the first buffer 151-1 or the second buffer 151-2 according to an embodiment of the present disclosure.

Since speech recognition is initiated only after the wake-up word is recognized, in such a case as illustrated in FIG. 6A where a spoken utterance is not buffered by the first buffer 151-1 or the second buffer 151-2, if a spoken sentence precedes the wake-up word, the spoken sentence preceding the wake-up word cannot be recognized.

FIG. 6B illustrates a case in which a user's spoken utterance is buffered by the first buffer 151-1 or the second buffer 151-2, and as indicated by a result of determining by the determiner 152, the wake-up word follows the spoken sentence within the spoken utterance. For example, if the spoken utterance is "Eeokeoneul kyeojwo eeoseuta (Turn on the air conditioner, Airstar)", in which case the wake-up word (eeoseuta) is present in the buffered spoken utterance, the speech recognition function may be activated, the isolator 153 may isolate the spoken sentence (Eeokeoneul kyeojwo) without the wake-up word from the buffered spoken utterance, and the controller 190 may control such that a processing result of the spoken sentence (the air conditioner being turned on) is outputted.

FIG. 6C illustrates a case in which a user's spoken utterance is buffered by the first buffer 151-1 or the second buffer 151-2, and as indicated by a result of determining by the determiner 152, the spoken sentence precedes the wake-up word within the spoken utterance. For example, if the spoken utterance is "Eeoseuta eeokeoneul kyeojwo (Airstar, turn on the air conditioner)", in which case the wake-up word (Eeoseuta) is present in the buffered spoken utterance, the speech recognition function may be activated, the isolator 153 may isolate the spoken sentence (eeokeoneul kyeojwo) without the wake-up word from the buffered spoken utterance, and the controller 190 may control such that a processing result of the spoken sentence (the air conditioner being turned on) is outputted.

FIG. 6D illustrates a case in which the user's spoken utterance is buffered by the first buffer 151-1 or the second buffer 151-2, and as indicated by a result of determining by the determiner 152, in the spoken utterance, the wake-up word is positioned within the spoken sentence, more specifically, before the first spoken segment preceding the wake-up word and after the second spoken segment following the wake-up word. For example, if the spoken utterance may be "Eeokeoneul eeoseuta kyeojwo (Turn on, Airstar, the air conditioner)", in which case the wake-up word (eeoseuta) is present in the buffered spoken utterance, the speech recognition function may be activated, the isolator 153 may isolate the spoken sentence (Eeokeoneul kyeojwo) without the wake-up word from the buffered spoken utterance, and the controller 190 may control such that the first spoken segment preceding the wake-up word and the second spoken segment following the wake-up word are combined and processed as a single voice command, and a processing result of the spoken sentence (the air conditioner being turned on) is outputted.

FIG. 6E illustrates a case in which a user's spoken utterance is buffered by the first buffer 151-1 or the second buffer 151-2, and as indicated by a result of determining by the determiner 152, the wake-up word is positioned between two spoken sentences within the spoken utterance (spoken sentence 1: a first spoken sentence preceding the wake-up word, and spoken sentence 2: a second spoken sentence following the wake-up word). For example, if the spoken utterance is "Eeokeoneul kyeojwoe eoseuta geurigo gonggi cheongjeong modeuro dongjakae (Turn on the air conditioner Airstar and drive it in clean mode)", in which case the wake-up word "eoseuta (Airstar)" is present in the buffered spoken utterance, the speech recognition function may be activated, the isolator 153 may isolate spoken sentence 1 (Eeokeoneul kyeojwoe) and spoken sentence 2 (gonggi cheongjeong modeuro dongjakae) without the wake-up word from the buffered spoken utterance, and the controller 190 may control such that a processing result of the spoken sentences (the air conditioner being turned on and driven in clean mode) is outputted.

As can be seen from FIG. 6B to FIG. 6E, if the wake-up word is present in the spoken utterance buffered by the first buffer 151-1 or the second buffer 151-2, the speech recognition function may be activated, the spoken sentence, regardless of its position in the spoken utterance, may be isolated and processed, and a processing result may be outputted, thus improving speech recognition processing performance.

Figure 7:
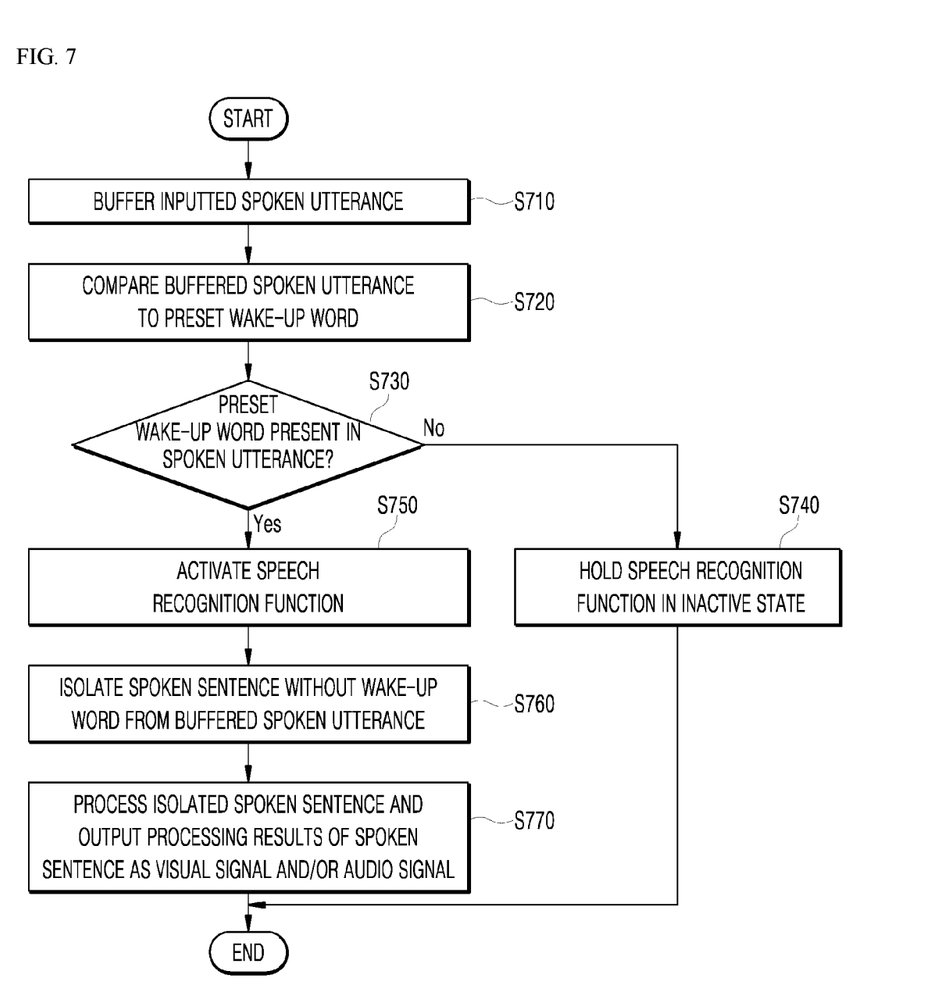
FIG. 7 is a flowchart of a speech recognition method according to an embodiment of the present disclosure.

FIG. 7 is a flowchart of a speech recognition method according to an embodiment of the present disclosure. Hereinbelow, a repetitive description of the parts previously described with reference to FIG. 1 to FIG. 6 will be omitted. Referring to FIG. 7, in step S7100, the speech recognition device 100 buffers an inputted spoken utterance.

In steps S720 and S730, the speech recognition device 100 compares the buffered spoken utterance to a preset wake-up word to determine whether the preset wake-up word is present in the spoken utterance.

In step S740, the speech recognition device 100 holds the speech recognition function in an inactive state if the result of determining indicates that the preset wake-up word is absent in the buffered spoken utterance.

In step S750, the speech recognition device 100 activates the speech recognition function if the result of determining indicates that the preset wake-up word is present in the buffered spoken utterance.

In step S760, the speech recognition device 100 isolates a spoken sentence without the wake-up word from the buffered spoken utterance.

In step S770, the speech recognition device 100 processes the isolated spoken sentence and outputs a processing result of the spoken sentence as a visual signal or an audio signal.

Figure 8:
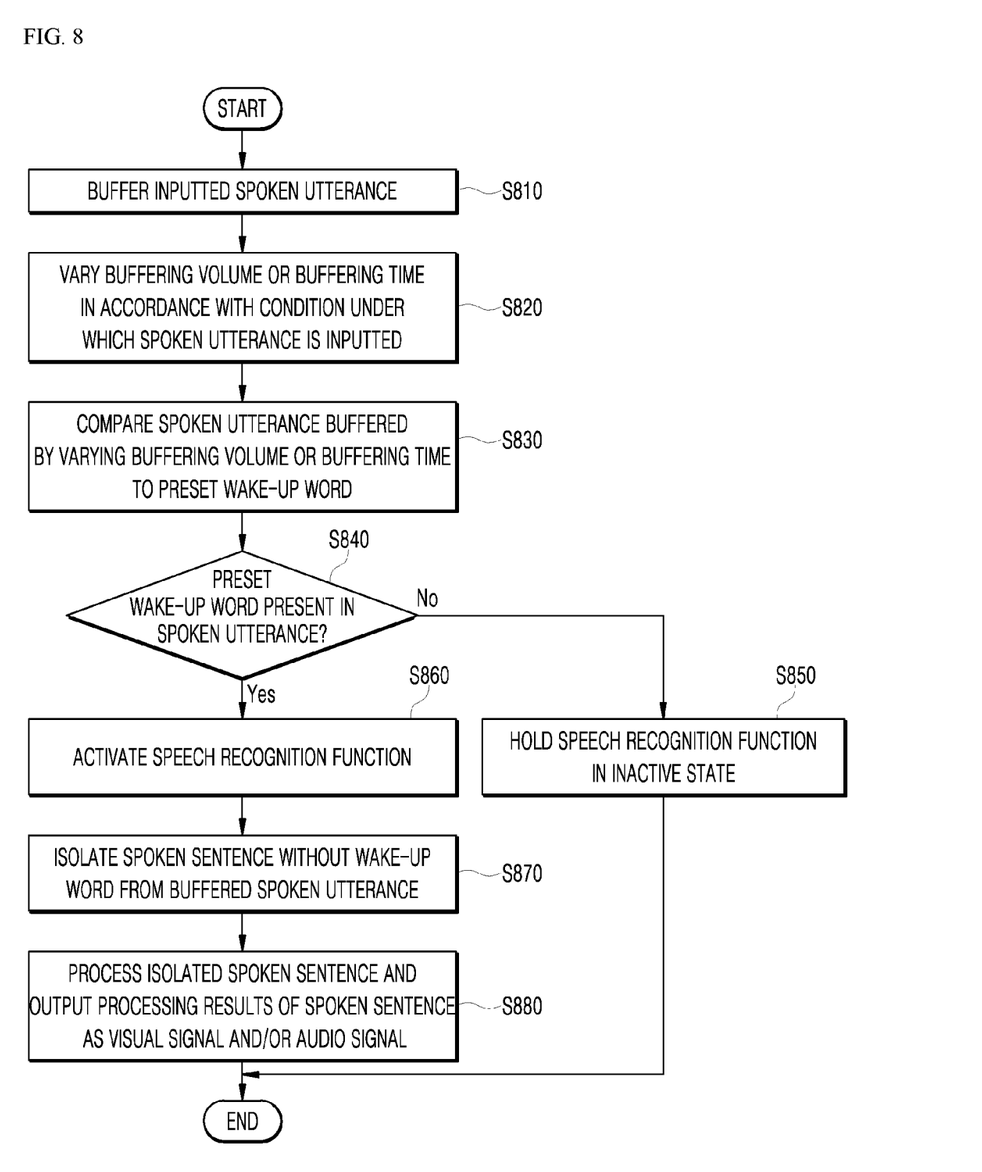
FIG. 8 is a flowchart of a speech recognition method according to another embodiment of the present disclosure.

FIG. 8 is a flowchart of a speech recognition method according to another embodiment of the present disclosure. Hereinbelow, a repetitive description of the parts previously described with reference to FIG. 1 to FIG. 7 will be omitted. Referring to FIG. 8, in step S810, the speech recognition device 100 buffers an inputted spoken utterance of a user.

In step S820, the speech recognition device 100 varies buffering volume or buffering time in accordance with environment conditions under which the spoken utterance of the user is inputted.

In steps S830 and S840, the speech recognition device 100 compares the spoken utterance buffered by varying the buffering volume or buffering time to a preset wake-up word, and determines whether the preset wake-up word is present in the spoken utterance.

In step S850, the speech recognition device 100 holds the speech recognition function in an inactive state if the result of determining indicates that the preset wake-up word is not present in the buffered spoken utterance.

In step S860, the speech recognition device 100 activates the speech recognition function if the result of determining indicates that the preset wake-up word is present in the buffered spoken utterance.

In step S870, the speech recognition device 100 isolates from the buffered spoken utterance a spoken sentence without the wake-up word.

In step S880, the speech recognition device 100 processes the isolated spoken sentence and outputs a processing result of the spoken sentence as a visual signal or as an audio signal.

The embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms 'a/an' and 'the' include both singular and plural references, unless the context clearly states otherwise. In addition, it should be understood that any numerical range recited herein is intended to include all sub-ranges subsumed therein (unless expressly indicated otherwise) and therefore, the disclosed numeral ranges include every individual value between the minimum and maximum values of the numeral ranges.

In addition, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the embodiments described above or by the use of such terms unless limited by the appended claims. In addition, it should be apparent to those skilled in the art that various alterations, permutations, and modifications may be made within the scope of the appended claims or equivalents thereof.

The present disclosure is thus not limited to the embodiments described above, and rather intended to include the following appended claims, and all modifications, equivalents, and alternatives falling within the spirit and scope of the following claims.

What is claimed is:

1. A speech recognition method by a speech recognition device, the speech recognition method comprising:
    buffering an inputted spoken utterance by varying a buffering volume in accordance with an environmental condition of the inputted spoken utterance;
    comparing the buffered spoken utterance to a preset wake-up word to determine whether the preset wake-up word is present in the spoken utterance;
    in response to a determination that the preset wake-up word is present in the spoken utterance, activating a speech recognition function and displaying a message corresponding to a stage of the speech recognition method;
    isolating, from the buffered spoken utterance, a spoken sentence as a voice command without the wake-up word, and a first spoken segment and a second spoken segment without the wake-up word, wherein the first spoken segment precedes the wake-up word, the second spoken segment follows the wake-up word, and the wake-up word is positioned within the spoken sentence; and
    processing the isolated spoken sentence and outputting a processing result of a single voice command, wherein the single voice command is formed by combining the first spoken segment preceding the wake-up word and the second spoken segment following the wake-up word.

2. A machine-readable non-transitory medium having stored thereon machine-executable instructions for implementing a speech recognition method, the instructions comprising:
    buffering an inputted spoken utterance by varying a buffering volume in accordance with an environmental condition of the inputted spoken utterance;
    comparing the buffered spoken utterance to a preset wake-up word to determine whether the preset wake-up word is present in the spoken utterance;
    in response to a determination that the preset wake-up word is present in the spoken utterance, activating a speech recognition function and displaying a message corresponding to a stage of the speech recognition method;
    isolating, from the buffered spoken utterance, a spoken sentence as a voice command without the wake-up word, and a first spoken segment and a second spoken segment without the wake-up word, wherein the first spoken segment precedes the wake-up word, the second spoken segment follows the wake-up word, and the wake-up word is positioned within the spoken sentence; and
    processing the isolated spoken sentence and outputting a processing result of a single voice command, wherein the single voice command is formed by combining the first spoken segment preceding the wake-up word and the second spoken segment following the wake-up word.

3. A speech recognition device configured to recognize an inputted spoken utterance, the speech recognition device comprising:
    a processor configured to:
    buffer the inputted spoken utterance by varying a buffering volume of the buffer in accordance with an environmental condition of the inputted spoken utterance;
    determine whether a preset wake-up word is present in the spoken utterance by comparing the spoken utterance buffered by the buffer to the preset wake-up word;
    activate a speech recognition function in response to a determination that the preset wake-up word is present in the spoken utterance, and to isolate from the buffered spoken utterance a spoken sentence as a voice command without the preset wake-up word, and a first spoken segment and a second spoken segment without the wake-up word, wherein the first spoken segment precedes the wake-up word, the second spoken segment follows the wake-up word, and the wake-up word is positioned within the spoken sentence; and
    cause the isolated spoken sentence to be processed, cause a display of a message corresponding to a stage of a speech recognition method in response to the determination that the preset wake-word is present in the spoken utterance, and cause a processing result of a single voice command to be outputted, wherein the single voice command is formed by combining the first spoken segment preceding the wake-up word and the second spoken segment following the wake-up word.

* * * * *